(12) United States Patent
Kim et al.

(10) Patent No.: US 12,153,024 B2
(45) Date of Patent: Nov. 26, 2024

(54) SYSTEM AND METHOD FOR FATIGUE TESTING OF METAL FOIL

(71) Applicant: LG ENERGY SOLUTION, LTD., Seoul (KR)

(72) Inventors: Ki Tae Kim, Daejeon (KR); Hyung Kyun Yu, Daejeon (KR); Ki Hoon Paeng, Daejeon (KR); Na Yoon Kim, Daejeon (KR); Jae Won Moon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 312 days.

(21) Appl. No.: 17/777,185

(22) PCT Filed: Jan. 28, 2021

(86) PCT No.: PCT/KR2021/001161
§ 371 (c)(1),
(2) Date: May 16, 2022

(87) PCT Pub. No.: WO2021/261700
PCT Pub. Date: Dec. 30, 2021

(65) Prior Publication Data
US 2022/0390341 A1 Dec. 8, 2022

(30) Foreign Application Priority Data

Jun. 23, 2020 (KR) .................. 10-2020-0076311

(51) Int. Cl.
*G01N 3/12* (2006.01)
*H01M 4/66* (2006.01)
*H01M 10/42* (2006.01)

(52) U.S. Cl.
CPC .............. *G01N 3/12* (2013.01); *H01M 4/661* (2013.01); *H01M 10/4285* (2013.01)

(58) Field of Classification Search
CPC .. G01N 3/12; G01N 3/18; G01N 3/28; G01N 3/10; B01D 63/103
See application file for complete search history.

(56) References Cited

U.S. PATENT DOCUMENTS 1,603,458 A * 10/1926 Guillery .................. G01N 3/28
73/87
3,736,794 A * 6/1973 Biondi ..................... G01N 3/28
73/838

(Continued)

FOREIGN PATENT DOCUMENTS

CN 105067506 A 11/2015
CN 106840922 A 6/2017

(Continued)

OTHER PUBLICATIONS

International Search Report (with partial translation) and Written Opinion dated May 14, 2021 issued in corresponding International Patent Application No. PCT/KR2021/001161.

(Continued)

*Primary Examiner* — Tran M. Tran
(74) *Attorney, Agent, or Firm* — MORGAN, LEWIS & BOCKIUS LLP

(57) ABSTRACT

According to the metal foil fatigue test system and metal foil fatigue test method of the present invention, the fatigue degree and lifespan of the metal foil may be easily predicted by injecting gas into the tube of a roll structure and discharging the gas to simulate charge/discharge of the electrode assembly.

19 Claims, 8 Drawing Sheets

(56) References Cited

U.S. PATENT DOCUMENTS

| | | | | |
|---|---|---|---|---|
| 3,906,782 | A | * | 9/1975 | Early ................. G01N 3/10 73/816 |
| 4,070,902 | A | * | 1/1978 | Knobel ............... G01B 13/00 73/37.5 |
| 4,182,013 | A | * | 1/1980 | Grossman ............ F16L 3/00 165/171 |
| 4,271,696 | A | * | 6/1981 | Wood ................. E21B 47/02 33/1 H |
| 4,326,405 | A | * | 4/1982 | Ingle, Jr. ............. G01N 19/04 73/37 |
| 4,356,720 | A | * | 11/1982 | Betts ................... G01N 3/12 73/167 |
| 4,393,699 | A | * | 7/1983 | Seiler, Jr. ............ G01N 19/04 73/827 |
| 4,735,092 | A | * | 4/1988 | Kenny ................. G01N 3/18 73/840 |
| 4,967,602 | A | * | 11/1990 | Norton ................ G01N 3/10 73/840 |
| 5,379,645 | A | * | 1/1995 | Smart .................. G01N 3/10 73/794 |
| 5,505,091 | A | * | 4/1996 | Ali ..................... G01M 5/005 73/714 |
| 5,992,242 | A | * | 11/1999 | Murphy ............... G01N 3/10 73/840 |
| 6,050,138 | A | * | 4/2000 | Lynch ................. G01N 3/10 73/827 |
| 6,230,569 | B1 | * | 5/2001 | Ball .................... G01N 3/00 73/827 |
| 6,321,594 | B1 | * | 11/2001 | Brown ................. G01B 7/22 73/150 A |
| 6,349,588 | B1 | * | 2/2002 | Brown ................. G01B 13/24 73/37.5 |
| 6,595,068 | B2 | * | 7/2003 | Brovold ............... G01N 3/10 73/807 |
| 7,783,438 | B2 | | 8/2010 | Redko et al. |
| 8,049,494 | B2 | | 11/2011 | Lepage et al. |
| 8,571,296 | B2 | * | 10/2013 | Jons ................... B01D 65/104 210/652 |
| 9,231,234 | B2 | * | 1/2016 | Kakinuma ........... H01M 50/133 |
| 9,935,344 | B2 | * | 4/2018 | Sawanishi ........... H01M 10/4285 |
| 10,206,575 | B2 | * | 2/2019 | Al-Mayah ........... A61B 5/0053 |
| 10,431,827 | B2 | | 10/2019 | Tode et al. |
| 10,680,288 | B2 | * | 6/2020 | Son ..................... H01M 10/4228 |
| 11,016,047 | B2 | * | 5/2021 | Redinger ............. G01N 27/20 |
| 11,079,297 | B2 | * | 8/2021 | Liu ..................... G01L 1/02 |
| 11,828,736 | B2 | * | 11/2023 | Mäntylä .............. D21F 1/48 |
| 11,885,735 | B2 | * | 1/2024 | Matonick ............ G01N 19/00 |
| 2004/0016301 | A1 | * | 1/2004 | Moreno ............... G01N 3/32 73/849 |
| 2005/0279162 | A1 | * | 12/2005 | Petrinic ............... G01N 3/317 73/159 |
| 2009/0223301 | A1 | * | 9/2009 | Schwab ............... G01N 3/12 73/825 |
| 2010/0242620 | A1 | | 9/2010 | Lorenz et al. |
| 2011/0293975 | A1 | * | 12/2011 | Iyori .................... H01M 50/169 429/90 |
| 2012/0268073 | A1 | * | 10/2012 | Morioka .............. B21D 13/04 29/17.2 |
| 2017/0269017 | A1 | * | 9/2017 | Klein ................... G01L 1/22 |
| 2019/0265135 | A1 | | 8/2019 | Jeong et al. |
| 2021/0041334 | A1 | * | 2/2021 | Adler .................. G01N 3/32 |
| 2022/0390340 | A1 | * | 12/2022 | Feng ................... G01N 3/307 |
| 2023/0402601 | A1 | * | 12/2023 | Yamazaki ........... H01M 10/052 |

FOREIGN PATENT DOCUMENTS

| | | |
|---|---|---|
| CN | 105067506 B | 7/2018 |
| CN | 110823702 A | 2/2020 |
| JP | 2000-340264 A | 12/2000 |
| JP | 2007-184160 A | 7/2007 |
| JP | 4038936 B2 | 1/2008 |
| JP | 2008-251286 A | 10/2008 |
| JP | 2011-082008 A | 4/2011 |
| JP | 6040891 B2 | 12/2016 |
| JP | 2018-152156 A | 9/2018 |
| JP | 6439838 B2 | 12/2018 |
| JP | 2020-024809 A | 2/2020 |
| KR | 10-0588507 B1 | 6/2006 |
| KR | 10-2014-0032659 A | 3/2014 |
| KR | 10-2016-0141261 A | 12/2016 |
| KR | 10-2018-0086079 A | 7/2018 |

OTHER PUBLICATIONS

Extended European Search Report issued in corresponding European Patent Application No. 21829429.6 dated Nov. 18, 2022.

Saboori et al., "Evaluating the flow stress of aerospace alloys for tube hydroforming process by free expansion testing," The International Journal of Advanced Manufacturing Technology (2014) 72:1275-1286.

Office Action dated Jul. 21, 2024 issued in Korean Patent Application No. 10-2020-0076311.

* cited by examiner

[FIG. 1]
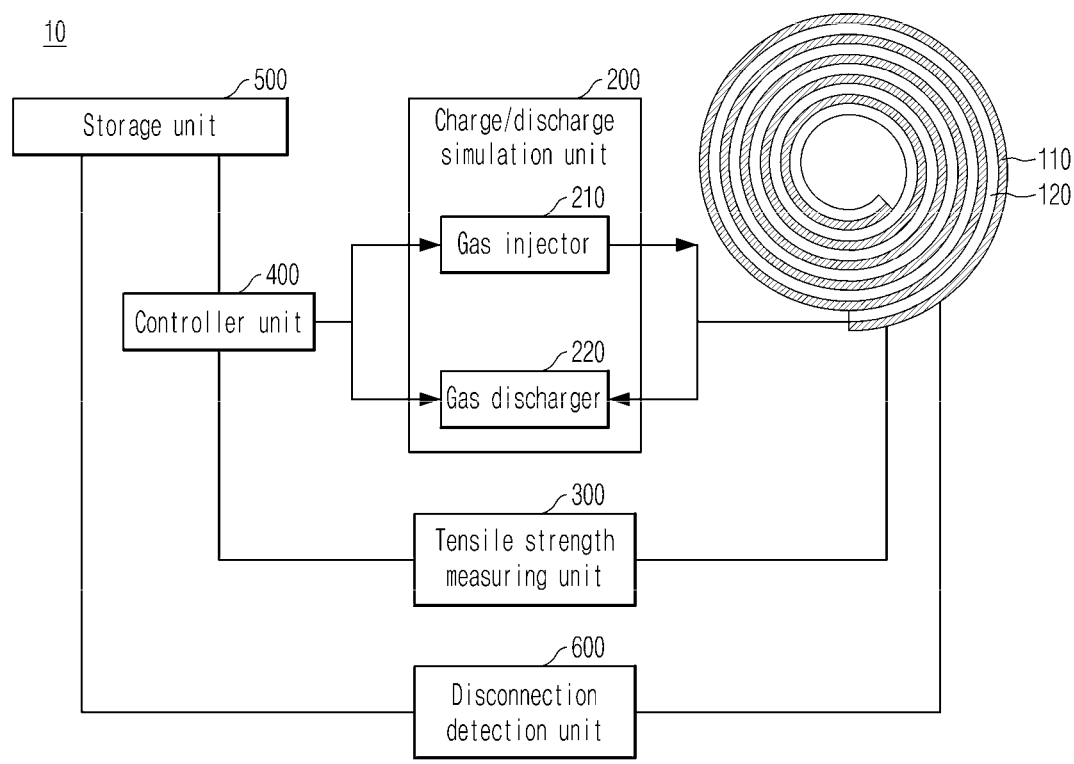

[FIG. 2]
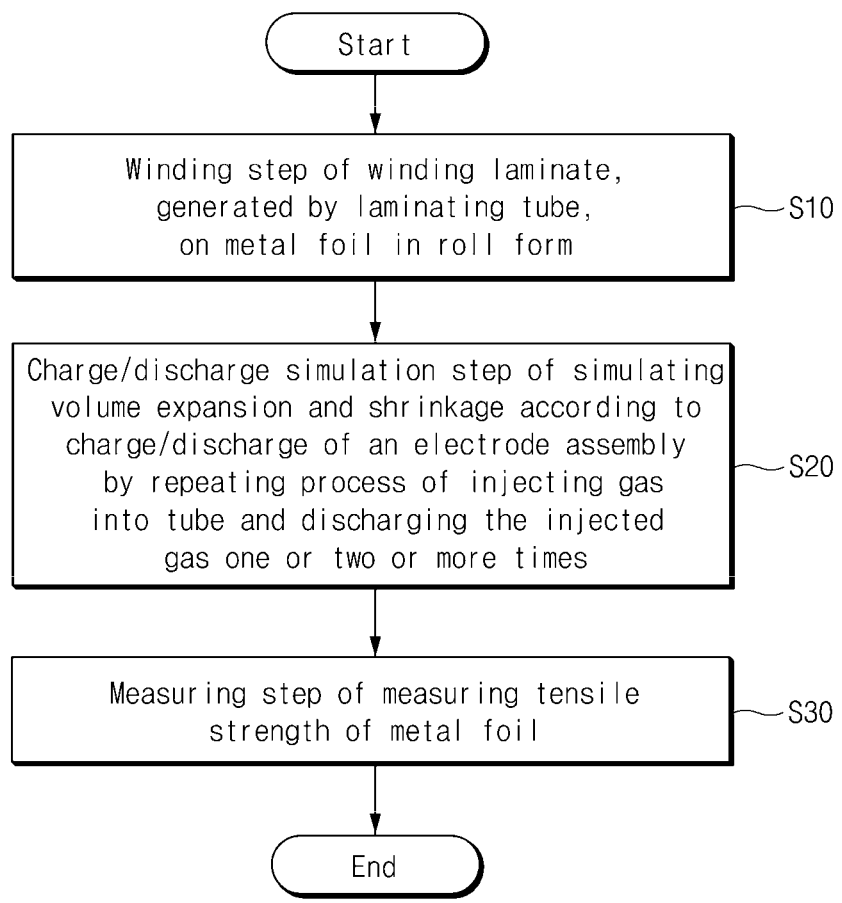

[FIG. 3]

[FIG. 4]
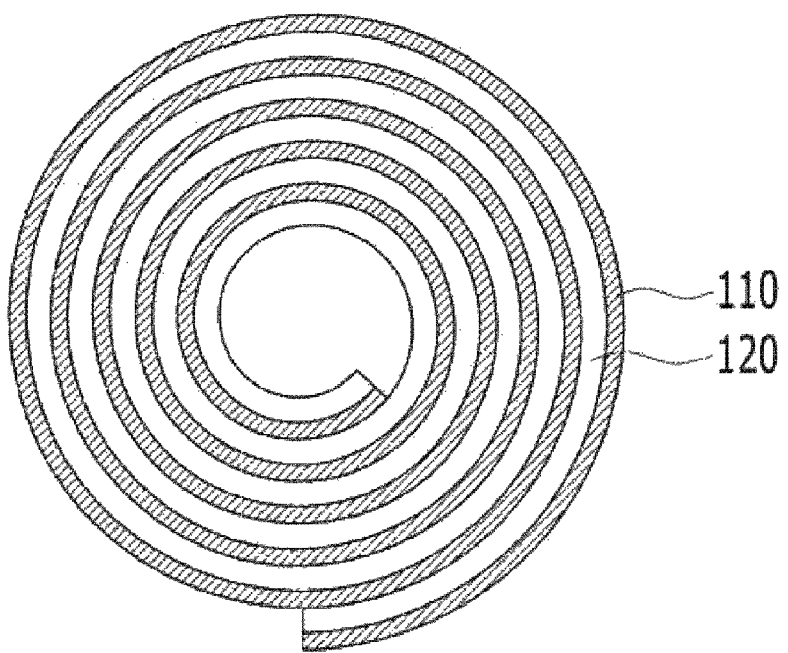

[FIG. 5]
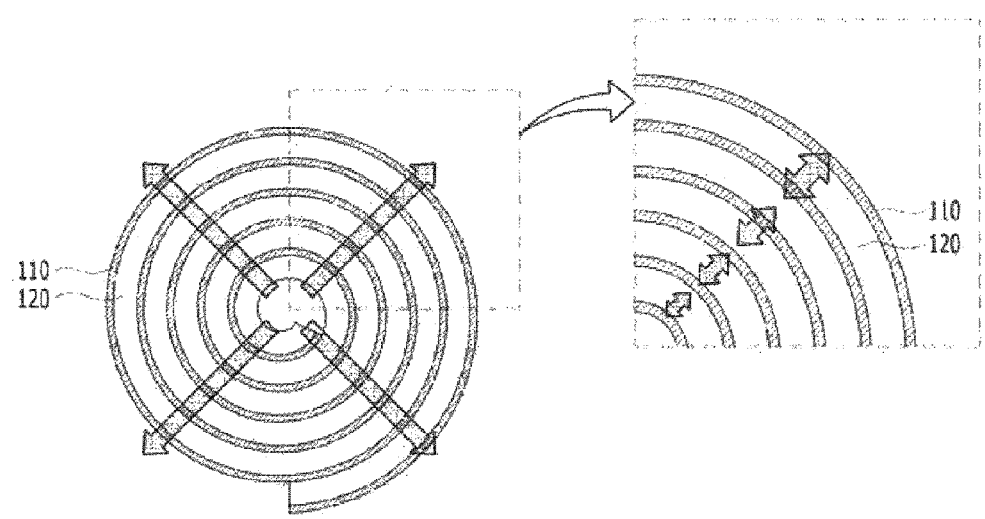

[FIG. 6]
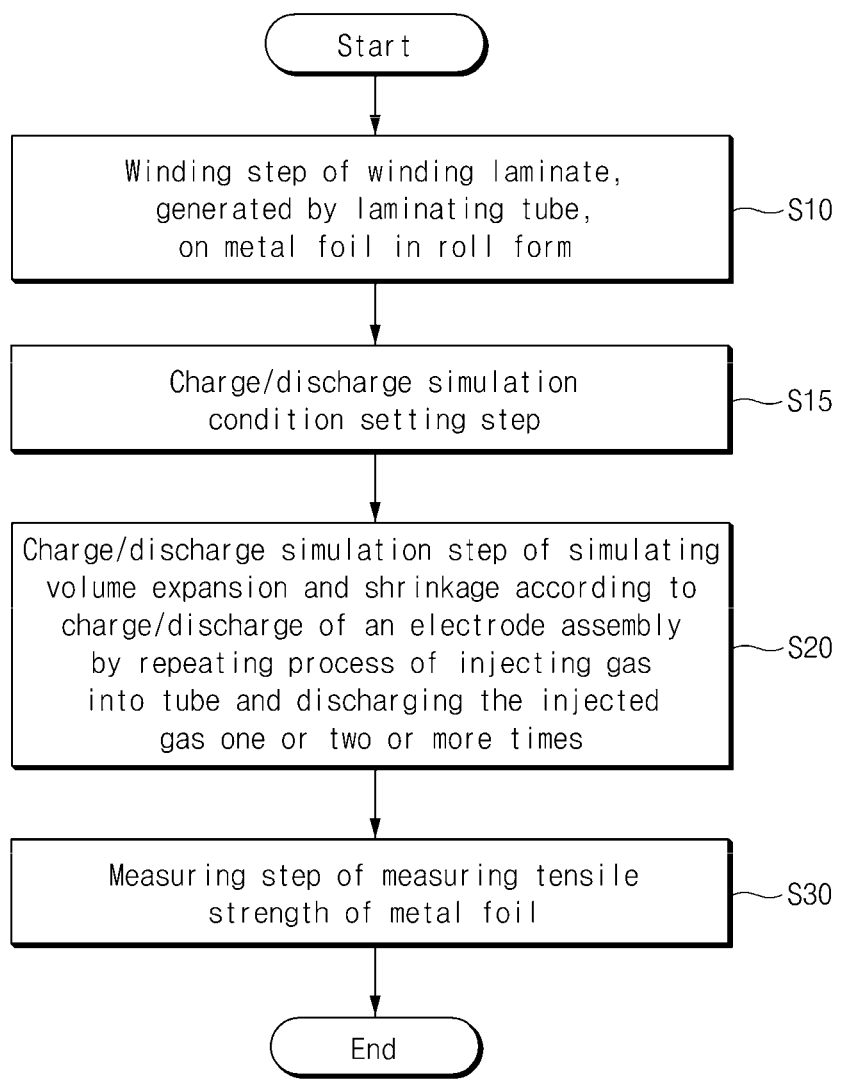

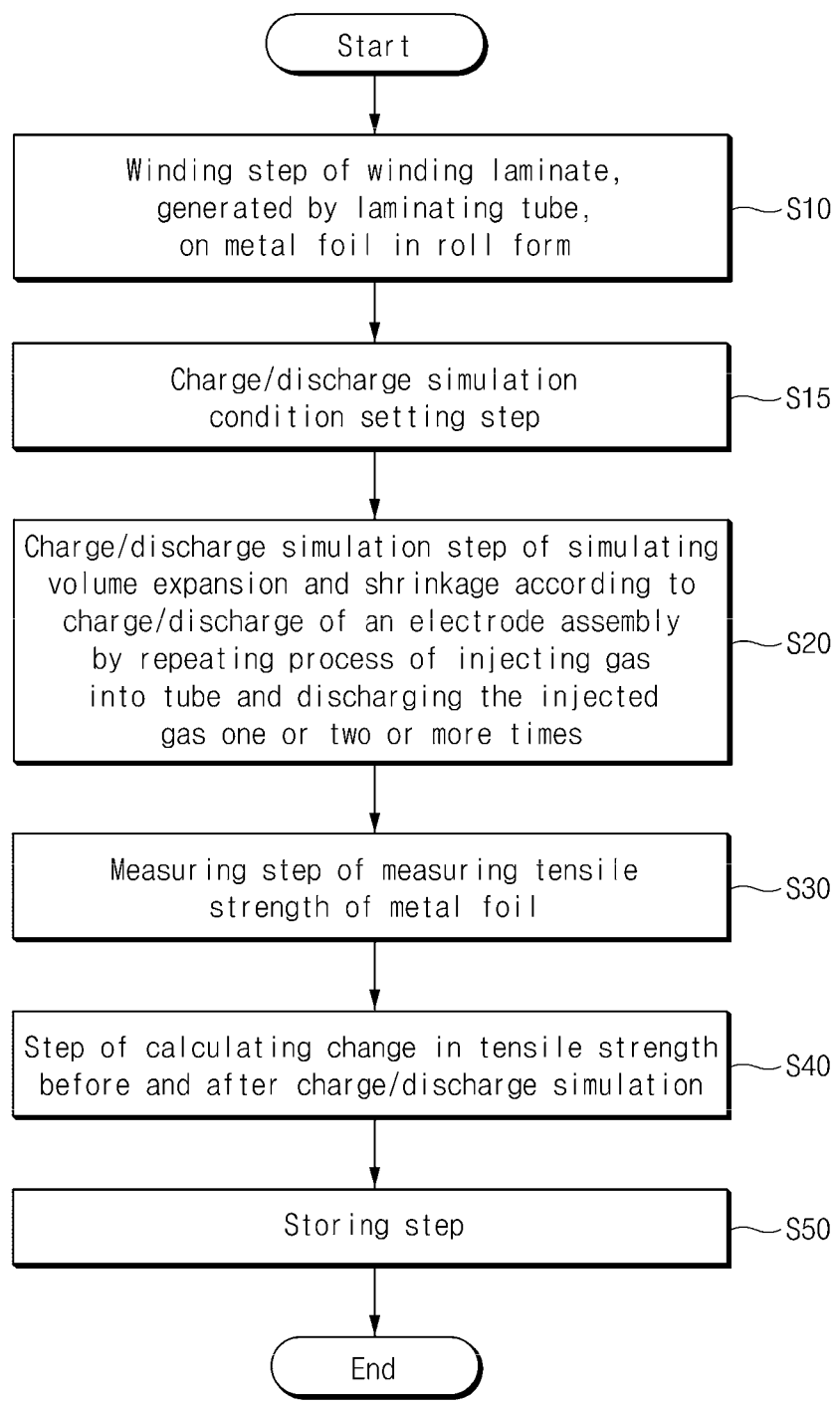

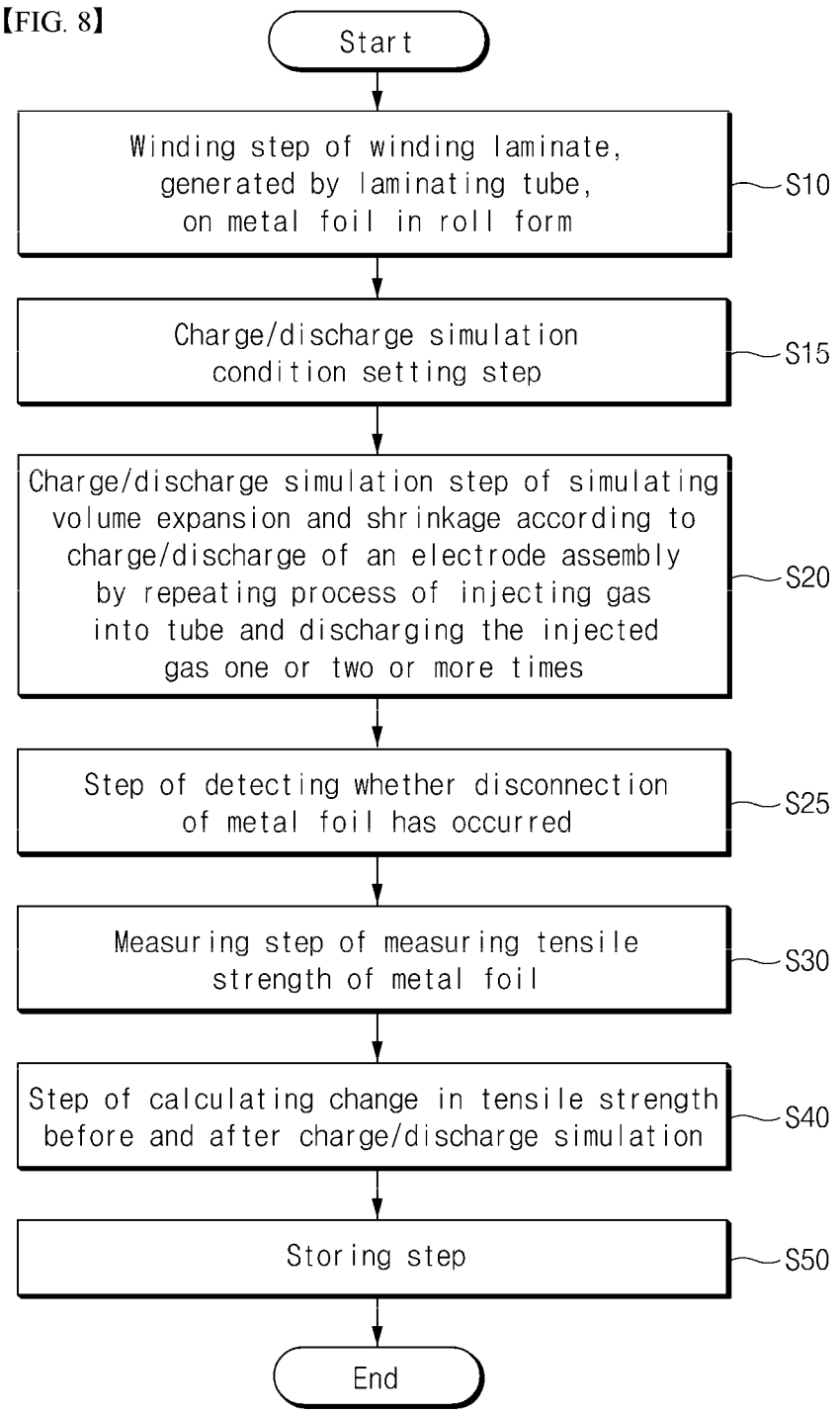

SYSTEM AND METHOD FOR FATIGUE TESTING OF METAL FOIL

TECHNICAL FIELD

This application claims the benefit of priority based on Korean Patent Application No. 10-2020-0076311, filed on Jun. 23, 2020, and the entire contents of the Korean patent application are incorporated herein by reference.

The present invention relates to a metal foil fatigue test system and a metal foil fatigue test method.

BACKGROUND ART

As technology development and demand for mobile devices increase, the demand for batteries as an energy source is rapidly increasing, and among such secondary batteries, many studies have been conducted on lithium secondary batteries having a high energy density and a discharge voltage, and have been commercialized and widely used.

The secondary battery is classified into a cylindrical battery and a prismatic battery in which an electrode assembly is embedded in a cylindrical or prismatic metal according to the shape of the battery case, and a pouch-shaped battery in which an electrode assembly is embedded in a pouch-shaped case of an aluminum laminate sheet.

Further, the electrode assembly embedded in the battery case is a power generating element capable of charging/discharging composed of a laminated structure of a positive electrode/separator/negative electrode. Representative examples thereof include a jelly-roll type electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound.

Among then, the jelly-roll type electrode assembly (hereinafter, also referred to as "jelly-roll") is easy to be manufactured and has a high energy density per weight.

In such a jelly-roll, when preparing a battery, a laminate of positive electrode/separator/negative electrode is wound in a circular shape, the outermost end is fixed by a seal tape, which is then accommodated in a battery case, that is, a metal can, after which electrolyte solution is prepared, and a top cap, where an electrode terminal (e.g., positive electrode terminal) has been formed on the open top of the battery case, is coupled.

However, in the jelly-roll type electrode assembly, as charge/discharge is repeated, lithium is repeatedly inserted into and desorbed from the negative electrode, and the volume of the electrode active material is thereby expanded or shrunk, and the degree of fatigue is accumulated in the current collector supporting the electrode active material. In particular, in the outer part of the jelly-roll, there is a significant change in the circumference due to the volume increase accumulated from the inside of the electrode assembly. As such, stress applied to the outer part of the metal foil significantly increases. Further, the stretching limit of the metal foil is exceeded due to accumulation of stress and degree of fatigue, the metal foil may be disconnected or come to have a crack.

Hence, there is a need for a technology for determining the lifespan of a metal foil by simulating repetition of charge/discharge of a jelly-roll and measuring stress and degree of fatigue of the metal foil according thereto.

DISCLOSURE

Technical Problem

The present invention has been devised to solve the above problems, and an object of the present invention is to provide a metal foil fatigue test system and metal foil fatigue test method for simulating repetition of charge/discharge of a jelly-roll, measuring the degree of fatigue accumulated in a metal foil as stress is applied to the metal foil according to repetition of charge/discharge, and predicting the point of time of disconnection of the metal foil through the measured degree of fatigue.

Technical Solution

A metal foil fatigue test system according to the present invention includes: a flat tube laminated on a metal foil; a charge/discharge simulation unit including a gas injector for injecting gas to the tube and a gas discharger for discharging gas from the tube; and a tensile strength measuring unit configured to measure tensile strength of the metal foil.

In one example, the metal foil fatigue test system further includes a winder configured to wind a laminate, which is generated by laminating the tube on the metal foil, in a roll structure.

In one example, the system further includes: a controller unit configured to set and change a simulation condition of the charge/discharge simulation unit; and a storage unit configured to store a result of measuring the tensile strength.

At this time, the tube has a flow path, through which gas is allowed to be injected and discharged, formed therein in a longitudinal direction, and one end of the flow path is closed, and the other end of the flow path is connected to the charge/discharge simulation unit.

In one example, a width (W1) of the tube corresponds to a width (W2) of the metal foil or is greater than the width (W2) of the metal foil. In a specific example, a length (L1) of the tube corresponds to a length (L2) of the metal foil or is greater than the length (L2) of the metal foil.

Further, a method for testing fatigue of a metal foil according to the present invention includes: a winding step of winding a laminate, which is generated by laminating the tube of claim 1 on a metal foil, in a roll structure; a charge/discharge simulation step of simulating a volume expansion and shrinkage according to a charge/discharge of an electrode assembly by repeating a process of injecting gas into the tube and discharging the injected gas one or two or more times; and a measuring step of measuring tensile strength of the metal foil.

In one example, the metal foil fatigue test method according to the present invention includes a step of setting a simulation condition in the charge/discharge simulation step, wherein injection and discharge of gas is performed according to the set simulation condition.

In a specific example, the simulation condition includes one or more of a total amount of gas injected into the tube, an injection amount of gas per hour, a discharge amount of gas per hour, maintenance time of from completion of injection to gas discharge, and a number of repetitions of injection and discharge of gas.

Further, the measuring step includes a process of measuring tensile strength of the metal foil before the winding step and after the charge/discharge simulation step, respectively. In a specific example, the process of measuring the tensile strength of the metal foil after the charge/discharge simulation step includes extracting a metal foil from a wound roll and measuring tensile strength of the extracted metal foil.

In another example, the measuring step further includes comparing tensile strength (TS1) of the metal foil measured before the winding step with tensile strength (TS2) of the metal foil measured after the charge/discharge simulation step, calculating its difference (TS1−TS2), and storing the difference in a storage unit.

In further another example, the measuring step further includes a process of preparing each specimen for each of a core region and an outermost region of the metal foil, measuring tensile strength for each specimen, and comparing the tensile strength of the core region with the tensile strength of the outermost region.

Further, the winding step winds the metal foil on the outermost region of a roll structure.

In further another example, the metal foil fatigue test method according to the present invention further includes a step of detecting whether there is a disconnection in the metal foil.

Advantageous Effects

According to the metal foil fatigue test system and metal foil fatigue test method of the present invention, the fatigue degree and lifespan of the metal foil may be easily predicted by injecting gas into the tube of a roll structure and discharging the gas to simulate charge/discharge of the electrode assembly.

BRIEF DESCRIPTION OF THE DRAWINGS

FIG. 1 is a block diagram illustrating each component of a metal foil fatigue test system according to the present invention.

FIG. 2 is a flowchart illustrating a metal foil fatigue test method in one example of the present invention.

FIG. 3 is a cross-sectional view of a laminate including a metal foil and a tube in one example of the present invention.

FIG. 4 shows a cross-section of a roll structure when winding a laminate containing a metal foil and a tube in one example of the present invention.

FIG. 5 shows a state change of a roll structure when injecting gas into a tube in a state that a laminate containing a metal foil and a tube has been wound in a roll structure.

FIGS. 6 to 8 are flowcharts showing a metal foil fatigue test method of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

The present invention relates to a metal foil fatigue test system and a metal foil fatigue test method.

As described above, in the jelly-roll type electrode assembly, as charge/discharge is repeated, lithium is repeatedly inserted into and desorbed from the negative electrode, and the volume of the electrode active material is thereby expanded or shrunk, and the degree of fatigue is accumulated in the current collector supporting the electrode active material. In particular, in the outer part of the jelly-roll, there is a significant change in the circumference due to the volume increase accumulated from the inside of the electrode assembly. As such, stress applied to the outer part of the metal foil significantly increases. Further, the stretching limit of the metal foil is exceeded due to accumulation of stress and degree of fatigue, the metal foil may be disconnected or come to have a crack.

As such, the inventors of the present invention have devised a metal foil fatigue test system and metal foil fatigue test method for simulating repetition of charge/discharge of a jelly-roll, measuring the degree of fatigue accumulated in a metal foil as stress is applied to the metal foil according to repetition of charge/discharge, and predicting the point of time of disconnection of the metal foil through the measured degree of fatigue.

FIG. 1 is a block diagram illustrating each component of a metal foil fatigue test system according to the present invention.

Referring to FIG. 1, a metal foil fatigue test system 10 includes a flat tube 120 laminated on a metal foil 110, a charge/discharge simulation unit 200, and a tensile strength measuring unit 300. In a specific example, the metal foil fatigue test system 10 according to the present invention includes: a flat tube 120 laminated on a metal foil 110; a charge/discharge simulation unit 200 including a gas injector 210 for injecting gas to the tube 120 and a gas discharger 220 for discharging gas from the tube; and a tensile strength measuring unit 300 for measuring tensile strength of the metal foil.

Further, the metal foil fatigue test system 10 according to the present invention may further include a winder (not shown) for winding a laminate, which is generated by laminating the tube 120 on the metal foil 110, in a roll structure. Further, when winding the laminate, which is generated by laminating the tube 120 on the metal foil 110, the winder preferably winds the metal foil 110 to be positioned at the outermost part. The winder may be a winder commonly used in the related art.

In the present invention, the metal foil 110 is a metal foil which becomes a subject of fatigue measurement and lifespan prediction, and may specifically contain at least one of copper, gold, nickel, aluminum and an alloy thereof. Alternatively, the metal foil 110 may be a copper or aluminum foil, and more specifically, it may be a copper foil. In particular, there is a high possibility that a crack may be generated in the negative electrode current collector according to the repetition of charge/discharge. Hence, the system or method of the present invention may become a system and method which are most appropriate for a copper foil which is frequently used as the negative electrode current collector.

The tube is used to simulate the electrode active material laminated on the metal foil, and injecting gas into the tube and discharging the gas is to simulate expansion and shrinkage of each electrode active material layer. In the present invention, the tube 120 means a pipe where a flow path is formed inside in a longitudinal direction. In the present invention, the metal foil 110 is preferably formed of a flat form or a sheet form which may be laminated, and when gas is injected into the tube 120, the tube 120 should be inflated, and thus one end of the flow path is preferably formed of a closed structure. Further, the tube 120 is preferably made of a material which may be swelled or inflated when gas is injected into the tube 120. For example, the tube 120 may be made of a synthetic resin such as a vinyl resin. Alternatively, the tube 120 may be a variable elastic body and may be made of materials containing an elastic polymer such as polyurethane or styrene-butadiene-styrene.

In one example, in the metal foil fatigue test system according to the present invention, the width (W1) of the tube 120 corresponds to a width (W2) of the metal foil 110 or is greater than the width (W2) of the metal foil 110. This is to evenly provide stress to the metal foil 110 by allowing the total area of the tube 120 to be swelled or inflated when injecting gas into the tube 120.

In another example, when the tube is an elastic body such as polyurethane, the width W1 of the tube is smaller than the width W2 of the metal foil 110. For example, the width W1 of the tube 120 may be a width in the range of 80 to 90% compared to the width W2 of the metal foil 110. In a specific example, when gas is injected into the tube 120, if the tube 120 is an elastic body, the metal foil 110 and the tube 120 are consecutively wound in the circumferential direction, and thus the gas injected into the tube 120 may move along the axial direction of the roll structure so that the tube 120 of the elastic body may be extended in the axial direction of the roll structure. Namely, this is also to evenly provide stress to the metal foil 110.

Further, the length L1 of the tube 120 may correspond to the length L2 of the metal foil 110 or may be greater than the length L2 of the metal foil 110. If the length L1 of the tube 120 is smaller than the length L2 of the metal foil 110, stress may not be provided to the entire metal foil 110. Hence, the length L1 of the tube 120 preferably corresponds to or is greater than the length L2 of the metal foil 110.

In one example, the charge/discharge simulation unit 200 according to the present invention includes a gas injector 210 and a gas discharger as described above. The charge/discharge simulation unit 200 is fluidly connected to the tube 120, and the gas injector 210 and the gas discharger 220 are preferably connected in a diverged manner. In one example, the gas injector 210 may be a gas-injecting pump and may set whether to inject gas by the gas valve, etc., and a flowmeter, etc. for adjusting the injection amount, injection rate, etc. may be connected to the gas injector 210.

Further, the gas discharger 220 may generally be a vacuum pump for discharging or injecting gas and may set whether gas is to be discharged or set the discharge amount of gas by the gas valve, etc.

In one example, the tensile strength measuring unit 300 is for measuring the tensile strength of the metal foil 110. In the metal foil fatigue test method to be described later, tensile strength of the metal foil 110 having gone through the charge/discharge simulation step of simulating volume expansion and shrinkage according to charge/discharge of the electrode assembly is measured. Meanwhile, the charge/discharge simulation conditions, etc. are set, and the tensile strength of the metal foil is measured according to the set simulation conditions. A specific method for measuring the tensile strength of the metal foil 110 will be described later.

To this end, the metal foil fatigue test system 10 according to the present invention further includes a controller unit 400 for setting and changing simulation conditions of the charge/discharge simulation unit 200. The controller unit 400 may play the role of inputting simulation conditions of the charge/discharge simulation unit 200 and receiving the input of the test result.

Specifically, the controller unit 400 may include an input tool (not shown) for inputting information of the metal foil 110, which becomes the subject of the fatigue test, and the controller unit 400 may receive the input of information of the metal foil 110 which becomes the subject of the fatigue test through this. For example, the information on the metal foil 110 may include a type of the metal foil 110, a tensile strength, the number of times of windings, and hardness. In particular, the tensile strength of the metal foil 110 is the tensile strength of the metal foil 110 before movement, and it can be used as the criterion for determining the increase of the degree of fatigue of the metal foil 110 after movement of the metal foil 110, compared with the tensile strength of the metal foil 110 measured after charge/discharge simulation of the metal foil 110 to be described later.

Further, the controller unit 400 may set simulation conditions of the charge/discharge simulation unit 200. In a specific example, the simulation condition of the charge/discharge simulation unit 200 may include one or more of a total amount of gas injected into the tube, an injection amount of gas per hour, a discharge amount of gas per hour, maintenance time of from completion of injection to gas discharge, and a number of repetitions of injection and discharge of gas. The controller unit 400 may control the charge/discharge simulation unit 200 to be operated according to the set charge/discharge simulation conditions.

Further, the controller unit 400 may include a receiving tool (not shown) configured to receive the input of the result of the fatigue test. When the fatigue test is completed, the controller unit 400 may receive the input of the measurement result of the tensile strength and transmit the information to the storage unit 500.

The storage unit 500 receives a test result, specifically a result of measuring tensile strength, from the controller unit 400 and stores the result. The storage unit 500 may store the result of measuring the tensile strength and make a database using with the result information. Specifically, the types of the metal foil may be classified according to the material, thickness and hardness of the metal foil 110, and the result of measuring tensile strength for the simulation conditions of each charge/discharge simulation unit 200 can be displayed through a table or a graph. Such measurement data may be used as grounds for predicting the degree of fatigue and lifespan of the metal foil 110 when various simulation conditions are combined.

Herein, the user may directly operate the controller unit 400 and the storage unit 500, but the controller unit 400 and the storage unit 500 may also be operated by an automated system. For example, when a charge/discharge simulation condition is input to the controller unit 400, the charge/discharge simulation unit 200 operates at predetermined conditions, and when completed, the metal foil 110 is transferred to the tensile strength measuring unit 300 to thereby measure the tensile strength. The result may be received by the controller unit 400 again and stored in the storage unit 500. When this process is completed, the controller unit 400 may automatically change the moving condition to repeat the same process.

Meanwhile, when injection and discharge of gas are repeatedly performed in the metal foil 110 according to the charge/discharge simulation unit, if stress applied to the metal foil 110, the metal foil 110 may be disconnected. Such a disconnection phenomenon may be checked through a crack generated on the metal foil 110, etc. The present invention may provide a disconnection detection unit 600 for detecting whether the metal foil 110 has been disconnected, to thereby recognize under what conditions the disconnection of the metal foil has occurred.

In the disconnection detection unit, the disconnection detection may be performed using a known method. For example, the disconnection detection may be performed using a camera, ultrasonic waves, or an eddy current detection scheme.

An imaging camera may capture a crack generated on the metal foil 110 having gone through the charge/discharge simulation unit 200. In the case of the ultrasonic wave detection method, the ultrasonic waves are oscillated to the metal foil 110, and waves returned by the echo phenomenon are sensed, to thereby detect whether disconnection has occurred through signal processing. The eddy current detection scheme is a scheme of detecting disconnection through the eddy current generated in the metal foil when allowing the coil, where the alternating current flows, to approach the metal foil. This detection method is known to those skilled in the art, and a detailed description thereof will be omitted here.

Further, the present invention provides a method for testing fatigue of a metal foil using the above-mentioned metal foil fatigue test system.

FIG. 2 is a flowchart illustrating a metal foil fatigue test method in one example of the present invention. FIG. 3 is a cross-sectional view of a laminate including a metal foil and a tube in one example of the present invention. FIG. 4 shows a cross-section of a roll structure when winding a laminate containing a metal foil and a tube in one example of the present invention. FIG. 5 shows a state change of a roll structure when injecting gas into a tube in a state that a laminate containing a metal foil and a tube has been wound in a roll structure.

Referring to FIG. 2, a method for testing fatigue of a metal foil according to the present invention includes: a winding step (S10) of winding a laminate, which is generated by laminating the tube of claim 1 on a metal foil, in a roll structure; a charge/discharge simulation step (S20) of simulating a volume expansion and shrinkage according to a charge/discharge of an electrode assembly by repeating a process of injecting gas into the tube and discharging the injected gas one or two or more times; and a measuring step (S30) of measuring tensile strength of the metal foil.

As illustrated in FIGS. 3 and 4, the winding step (S10) of winding the laminate in the form of a roll includes the process of forming a laminate by laminating the tube 120 on one surface of the metal foil 110 and winding the laminate. At this time, the laminate is wound so that the metal foil 110 is positioned at the outermost part of a roll structure. The tube 120 corresponds to the simulation of an electrode active material layer, specifically a negative electrode active material layer. Meanwhile, the thickness of the tube 120 may be greater than that of the metal foil 110.

The tube 120 has a structure having a flow path formed in a longitudinal direction inside as described above. Further, the metal foil 110 is formed of a flat form or a sheet form which may be laminated. Further, if gas is injected into the tube 120, the tube 120 should be inflated, and thus one end of the flow path has a closed structure. Further, the laminate may be wound so that one end of the tube 120, where the flow path has been closed, may be located in the core region, and the other end of the tube 120, where the flow path has been opened, may be located in the outermost winding layer region.

As illustrated in FIG. 5, the charge/discharge simulation step (S20) includes a process of injecting gas into the tube 120 and discharging the gas in a roll structure in which the metal foil 110 and the tube 120 are wound. Specifically, the charge/discharge simulation step (S20) includes simulating volume expansion and shrinkage of the tube 120 according to charge/discharge of the electrode assembly by repeating the process of injecting gas into the tube 120 and discharging the injected gas one or more times. Herein, when injecting gas into the tube 120, the process of expansion of the tube 120 corresponds to the simulation of the expansion process of the negative electrode active material in the jelly-roll type electrode assembly, and the charge/discharge simulation step of the present invention corresponds to the simulation of the charge/discharge process of the jelly-roll type electrode assembly.

Further, in the roll structure in which the metal foil 110 and the tube 120 are wound, when gas is injected into the tube 120, the volume of the tube 120 increases, and the volume of the tube accumulated from the inside of the roll structure increases, which causes a change in the circumference. Further, stress is applied to the metal foil 110 due to the volume increase of the tube 120. More specifically, stress is applied in the circumferential direction, and the largest stress and stretching may occur in the metal foil 110 located in the outermost region of the roll structure.

FIG. 6 is a flowchart illustrating a metal foil fatigue test method in another example of the present invention.

Referring to FIG. 6, the charge/discharge simulation step (S20) further includes a step (S15) of setting the charge/discharge simulation condition and includes a process of performing injection and discharge of gas according to predetermined simulation conditions. In a specific example, the simulation condition may include one or more of a total amount of gas injected into the tube, an injection amount of gas per hour, a discharge amount of gas per hour, maintenance time of from completion of injection to gas discharge, and a number of repetitions of injection and discharge of gas.

In one example, in the charge/discharge simulation step (S20), the charge/discharge simulation step may be set as the number of repetitions of injection and discharge of gas. Specifically, when the process of injecting gas to the tube and discharging the injected gas is repeatedly performed, the expansion and shrinkage of the tube also repeatedly occurs. As such, the elongation rate of the metal foil is lowered. In this case, the state of the metal foil can be evaluated by accumulating the degree of fatigue to the metal foil of a roll structure. Alternatively, the point of time of breakage of the metal foil may be evaluated by evaluating the physical properties of the metal foil where the fatigue has been accumulated.

Namely, in the charge/discharge simulation step (S20), it is possible to recognize in what conditions the degree of fatigue of the metal foil easily increases or the breakage of the metal foil occurs at the time of simulation of the charge/discharge of the metal foil by setting simulation conditions, from which it is possible to predict the degree of fatigue and lifespan according to the movement.

Further, the metal foil fatigue test method according to the present invention includes a measuring step (S30) of measuring tensile strength of a metal foil.

In one example, the measuring step (S30) may include a process of measuring tensile strength of the metal foil before the winding step and after the charge/discharge simulation step, respectively. Here, the process of measuring the tensile strength of the metal foil after the charge/discharge simulation step includes extracting a metal foil from a wound roll and measuring tensile strength of the extracted metal foil.

The tensile strength of the metal foil may be measured according a normal known method. For example, tensile force is applied to both sides of a portion to be measured in the metal foil, and the force applied to the metal foil when a breakage occurs may be measured. At this time, the value obtained by dividing the maximum tensile load measured at this time by the cross-sectional area of the metal foil may be defined as tensile strength. For example, the tensile strength may be measured by using a tensile strength measuring apparatus such as a tension annealing (TA) device or a universal testing machine (UTM). As such, the method of measuring the tensile strength is known to one of ordinary skill in the art, and thus a detailed description thereof will be omitted here.

FIG. 7 is a flowchart illustrating a metal foil fatigue test method in further another example of the present invention.

In a specific example, the metal foil fatigue test method according to the present invention further includes comparing tensile strength (TS1) of the metal foil measured before the winding step with tensile strength (TS2) of the metal foil measured after the charge/discharge simulation step, calculating its difference (TS1−TS2), and storing the difference in a storage unit (S40 and S50). More specifically, the criteria for determining the increase of the degree of fatigue of the metal foil after charge/discharge simulation of the metal foil may be obtained by comparing the tensile strength (TS1) of the metal foil measured before the winding step with the tensile strength (TS2) of the metal foil measured after the charge/discharge simulation step. Namely, the lifespan of the metal foil and the degree of fatigue according to the charge/discharge simulation condition may be easily recognized by comparing the tensile strength (TS1) of the metal foil measured before the winding step (S10) with the tensile strength (TS2) of the metal foil measured after the charge/discharge simulation step.

In one example, the measuring step (S30) further includes a process of preparing each specimen for each of a core region and an outermost region of the metal foil, measuring tensile strength for each specimen, and comparing the tensile strength of the core region with the tensile strength of the outermost region. In a specific example, after the charge/discharge simulation step, in the roll structure in which the tube and the metal foil are wound, the core region may be a portion where there is the minimum change in the circumference, and the outermost region may be a portion where there is the maximum change in the circumference. Namely, the lifespan of the metal foil and the degree of fatigue according to the charge/discharge simulation condition may be easily recognized by comparing tensile strengths of respective regions. Further, when preparing a jelly-roll type electrode assembly, the number of times of winding of the electrode may be set, or the stretching level of the outermost region compared to the core region may be checked.

In another example, the measuring step (S30) includes the process of preparing the metal foil of the $k^{th}$ layer and $(k+1)^{th}$ layer of the winding layer as specimen in the roll structure of the metal foil, where the winding layer is wound n times, measuring the tensile strength of the metal foil specimen, respectively, and comparing the tensile strength of each layer. Here, n is an integer of 2 or more, and k is 1 or more and is n−1 or less. Further, as described above, by comparing tensile strengths of respective winding layers, the number of times of windings of the electrode, et. may be set at the time of preparing a jelly-roll type electrode assembly, or the stretching level, etc. of each winding layer may be checked. Namely, the lifespan of the metal foil and the degree of fatigue according to the charge/discharge simulation condition may be easily recognized.

FIG. 8 is a flowchart illustrating a metal foil fatigue test method in further another example of the present invention.

Further, the metal foil fatigue test method may further include a step (S25) of detecting whether the metal foil has been disconnected.

According to the metal foil fatigue test method of the present invention, it is possible to recognize in what conditions the metal foil is disconnected by detecting whether a disconnection phenomenon such as a crack occurs in the metal foil separately from the measurement of the tensile strength. The disconnection detection may be performed using a camera, ultrasonic waves, or an eddy current detection scheme, as described above.

The step (S25) of detecting whether the disconnection has occurred may be performed during the charge/discharge simulation step. Namely, it is possible to recognize at which point of time disconnection occurs in a specific movement condition by real time performance during the charge/discharge simulation of the metal foil.

Further, the step (S25) of detecting whether the disconnection has occurred may be performed after the charge/discharge simulation step. In this case, whether the disconnection has occurred is preferably performed before measuring the tensile strength.

Hereinafter, various forms of the metal foil fatigue test method according to the present invention will be described in detail.

First Embodiment

In one example, a method for testing fatigue of a metal foil according to the present invention includes: a winding step (S10) of winding a laminate, which is generated by laminating the tube of claim 1 on a metal foil, in a roll structure; a charge/discharge simulation step (S20) of simulating a volume expansion and shrinkage according to a charge/discharge of an electrode assembly by repeating a process of injecting gas into the tube and discharging the injected gas one or two or more times; and a measuring step (S30) of measuring tensile strength of the metal foil.

Meanwhile, the measuring step further includes comparing tensile strength (TS1) of the metal foil measured before the winding step with tensile strength (TS2) of the metal foil measured after the charge/discharge simulation step, calculating its difference (TS1−TS2), and storing the difference in a storage unit (S40 and S50). More specifically, the tensile strength (TS1) of the metal foil is measured before the winding step, and the charge/discharge simulation step is performed, and the tensile strength (TS2) of the metal foil is then measured after the charge/discharge simulation step. Further, respective tensile strength values may be compared and the difference (TS1−TS2) may be calculated, and the result may be stored in the storage unit.

In one example, the measuring step (S30) includes measuring the tensile strength by preparing respective specimen of the outermost region and the core region of the metal foil. Further, a process of comparing tensile strength of each region is further included. As described above, after the charge/discharge simulation step, in the roll structure in which the tube and the metal foil are wound, the core region may be a portion where there is the minimum change in the circumference, and the outermost region may be a portion where there is the maximum change in the circumference. Namely, the lifespan of the metal foil and the degree of fatigue according to the charge/discharge simulation condition may be easily recognized by comparing tensile strengths of respective regions. Further, when preparing a jelly-roll type electrode assembly, the number of times of winding of the electrode may be set, or the stretching level of the outermost region compared to the core region may be checked.

Since each step has been described above, the detailed description of each step will be omitted here.

Second Embodiment

In another example, the measuring step (S30) of the metal foil fatigue test method according to the present invention includes measuring the tensile strength by preparing each specimen of the core region, the medium region, and the outermost region of the metal foil. Further, a process of comparing tensile strength of each region is further included. Herein, a medium region means a medium region between the core region and the outermost region in the metal foil.

Namely, by comparing tensile strengths of respective regions, the number of times of windings of the electrode, et. may be set at the time of preparing a jelly-roll type electrode assembly, or the stretching level, etc. of the outermost region compared to the core region may be checked.

Since each step has been described above, the detailed description of each step will be omitted here.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

The invention claimed is:

1. A system for testing fatigue of a metal foil comprising:
a flat tube in a roll structure the metal foil laminated along with the flat tube;
a charge/discharge simulation unit including a gas injector for injecting gas to the flat tube such that the flat tube is inflated when the gas is injected into the tube thereby stress is provided with the metal foil and a gas discharger for discharging gas from the flat tube; and
a tensile strength measuring unit to measure
tensile strength (TS1) of the metal foil before the charge/discharge simulation unit injects or discharges the gas, and
tensile strength (TS2) of the metal foil after the charge/discharge simulation unit injects or discharges the gas.

2. The system of claim 1, further comprising a winder configured to wind both the flat tube and the metal foil into a roll structure.

3. The system of claim 1, further comprising:
a controller unit configured to set and change a simulation condition of the charge/discharge simulation unit; and
a storage unit configured to store a result of measuring the tensile strength.

4. The system of claim 1, wherein the tube has a flow path, through which gas is allowed to be injected and discharged, formed therein in a longitudinal direction, and
wherein one end of the flow path is closed, and the other end of the flow path is connected to the charge/discharge simulation unit.

5. The system of claim 1, wherein a width (W1) of the tube corresponds to a width (W2) of the metal foil or is greater than the width (W2) of the metal foil.

6. The system of claim 1, wherein a length (L1) of the tube corresponds to a length (L2) of the metal foil or is greater than the length (L2) of the metal foil.

7. A method for testing fatigue of a metal foil using the system according to claim 1, comprising:
laminating the flat tube on the metal foil,
winding both the flat tube and the metal foil in a roll form;
simulating a volume expansion and shrinkage of the metal foil by the charge/discharge simulation unit such that the flat tube is inflated when the gas in injected into the tube thereby stress is provided with the metal foil and repeating injecting gas into the flat tube and discharging the injected gas one or two or more times; and
measuring the tensile strength of the metal foil by the tensile strength measuring unit.

8. The method of claim 7, further comprising setting a simulation condition in the simulating a volume expansion and shrinkage,
wherein injection and discharge of gas is performed according to a set simulation condition.

9. The method of claim 8, wherein the simulation condition includes one or more of a total amount of gas injected into the tube, an injection amount of gas per hour, a discharge amount of gas per hour, maintenance time of from completion of injection to gas discharge, and a number of repetitions of injection and discharge of gas.

10. The method of claim 7, the measuring includes measuring the tensile strength of the metal foil before the winding and after the charge/discharge simulation step, respectively.

11. The method of claim 10, wherein the measuring the tensile strength of the metal foil after the simulating a volume expansion and shrinkage includes extracting a metal foil from a wound roll and measuring tensile strength of the extracted metal foil.

12. The method of claim 7, wherein the measuring further includes:
measuring a tensile strength of a specimen of a core region of the metal foil and a specimen of an outermost region of the metal foil after the winding the laminate in a roll form, and
comparing the tensile strength of the core region with the tensile strength of the outermost region.

13. The method of claim 7, wherein the winding step winds the metal foil on the outermost region of a roll structure.

14. The method of claim 7, further comprising a step of detecting whether there is a disconnection in the metal foil.

15. The system of claim 1, wherein the metal foil comprises copper, gold, nickel, aluminum or alloys thereof.

16. The system of claim 1, wherein the flat tube comprises an elastic polymer.

17. The system of claim 1, wherein the flat tube comprises polyurethane or styrene-butadiene-styrene.

18. The system of claim 1, wherein a width of the flat tube is 80% to 90% of a width of the metal foil.

19. The system of claim 1, wherein the stress provided with the metal foil is caused by an increase of an inside volume of the flat tube.

* * * * *